(12) United States Patent
Wang et al.

(10) Patent No.: US 10,446,010 B2
(45) Date of Patent: Oct. 15, 2019

(54) GROUPED MULTI-DEVICE ANTI-LOSS WARNING SYSTEM AND A METHOD FOR EXECUTING THE SAME

(71) Applicant: Kun Shan University, Tainan (TW)

(72) Inventors: Ping-Tsung Wang, Tainan (TW); Han-Chiang Chen, Tainan (TW); Ming-Fang Wu, Tainan (TW)

(73) Assignee: KUN SHAN UNIVERSITY, Tainan (TW)

( * ) Notice: Subject to any disclaimer, the term of this patent is extended or adjusted under 35 U.S.C. 154(b) by 0 days.

(21) Appl. No.: 15/852,031

(22) Filed: Dec. 22, 2017

(65) Prior Publication Data

US 2018/0286214 A1 Oct. 4, 2018

(30) Foreign Application Priority Data

Mar. 30, 2017 (TW) .............................. 106110823 A (51) Int. Cl.
G08B 21/24 (2006.01)
G08B 25/10 (2006.01)
G08B 25/14 (2006.01)
H04W 84/18 (2009.01)

(52) U.S. Cl.
CPC ............. *G08B 21/24* (2013.01); *G08B 25/10* (2013.01); *G08B 25/14* (2013.01); *H04W 84/18* (2013.01)

(58) Field of Classification Search
CPC ........ G08B 21/24; G08B 25/10; G08B 25/14; G08B 26/00; G08B 27/00; G08B 27/005; H04W 84/18; H04W 84/20; H04W 84/22; H04W 84/04

USPC .......................................................... 340/571
See application file for complete search history.

(56) References Cited

U.S. PATENT DOCUMENTS

| 2006/0285529 | A1* | 12/2006 | Hares | ...................... | H04L 45/16 370/338 |
| 2014/0300483 | A1* | 10/2014 | Guo | .................... | G08B 21/0258 340/686.6 |
| 2015/0356861 | A1* | 12/2015 | Daoura | .............. | G08B 21/0269 340/539.13 |

FOREIGN PATENT DOCUMENTS

| TW | I367460 B | 7/2012 |
| TW | I436669 B | 5/2014 |
| TW | I470445 B | 1/2015 |
| TW | I484447 B | 5/2015 |
| TW | I501200 B | 9/2015 |

* cited by examiner

*Primary Examiner* — Steven Lim
*Assistant Examiner* — Mancil Littlejohn, Jr.
(74) *Attorney, Agent, or Firm* — Chun-Ming Shih (57) ABSTRACT

The present disclosure relates to a grouped multi-device anti-loss warning system with multiple warning devices categorized as one group in which the warning devices granted an identical Group ID and not divided into mater/slave devices communicate with one another; a warning message can be activated among these warning devices in which contacts are disabled for broadcasting a notification that a group member (warning device) is considered as being out-of-touch within a preset period and fulfilling an anti-loss effect by mutual reminders among warning devices in the same group.

9 Claims, 9 Drawing Sheets

GROUPED MULTI-DEVICE ANTI-LOSS WARNING SYSTEM AND A METHOD FOR EXECUTING THE SAME

BACKGROUND OF THE INVENTION

1. Field of the Invention

The present disclosure relates to a multi-device anti-loss warning system and a method for executing the same, particularly a grouped multi-device anti-loss warning system and a method for executing the same comprising multiple warning devices categorized as one group in which the warning devices are not divided into mater/slave devices but capable of communicating with one another and a warning message can be activated among these warning devices in which contacts are disabled for broadcasting the notification that a group member (warning device) is considered as being out-of-touch and fulfilling an anti-loss effect by mutual reminders among warning devices in the same group.

2. Description of the Prior Art

The common anti-loss technique is based on a smart phone which matches up with at least a tag attached on a person or an object to be tracked through signals emitted from the tag(s) and a wireless transmission protocol between the tag(s) and the smart phone. Because the signals from the tag(s) are received by the smart phone in which an executive software program is downloaded and installed within the coverage of a wireless transmission protocol, a person or an object moving into the coverage can be tracked by the executive software program. On the other hand, when no signal from the tag(s) is received by the smart phone, a person or an object to be tracked is considered as traveling outside the coverage by the executive software program and the condition of the person or object lost is sent to the smart phone on which a warning message is also displayed.

In addition, some systems in which the GPS is installed are available to smart phones for tracking and searching people or objects accurately.

These techniques have been disclosed in granted inventions of Taiwan, for example, "an object anti-loss device and a method thereof" (TW 1501200), "searching device, stray-avoiding system and operation method therefor" (TW 1484447), "a target searching system and a method thereof" (TW 1470445), "a smart phone with a cell phone searching system and a method of searching and positioning a lost smart phone" (TW 1436669), and "an electric device with an anti-loss detection function and a method thereof" (TW 1367460).

However, the devices in the previous patents are divided into master as well as slave devices and an accessory device (for example, a tag on a person or an object to be tracked) is tracked by a host device (for example, a smart phone) from which a warning message is produced, that is, an accessory device plays a passive role without an active function. Moreover, the high-cost anti-loss & tracking system which is installed in the above host device or even activated by a smart phone is considered as being not effective economically. Particularly, the whole anti-loss & tracking system breaks down in case of the host device is out-of-order or lost; the one-to-one connection rather than the one-to-many connection between a host device and an accessory device for the tracking function and no accessory device added or deleted immediately make no contribution to practicability.

SUMMARY OF THE INVENTION

A grouped multi-device anti-loss warning system and a method for executing the same provided in the present disclosure is characteristic of warning devices that are not categorized as mater or slave devices for mutual communication but constitute a group in which each warning device is capable of detecting any other warning devices for no warning device lost.

The purposes and effects of a grouped multi-device anti-loss warning system are fulfilled according to following techniques:

a grouped multi-device anti-loss warning system has a plurality of warning devices, each of them comprises a power supply module as well as a wireless transceiver module, a processing module and a warning module, all of which are electrically connected to the power supply module, wherein:

the wireless transceiver module sends a unique packet during broadcasting time, receives and scans other unique packets from other warning devices during receiving & scanning time, and saves the received and scanned unique packets in a memory unit of the processing module;

the processing module comprises a memory unit which has a scan access & control section and an alarm access & control section wherein: the scan access & control section is prepared for accessed data structure in a Media Access Control Address (MAC Address) field and a corresponding counter field; the processing module creates a packet in which data such as Group ID and MAC Address are attached; each of a plurality of warning devices, which are paired with one another and categorized as a same group based on an identical Group ID, records media access control addresses of all other members in the MAC Address fields; the alarm access & control section is prepared for accessed data structure in a Media Access Control Address (MAC Add) field; the wireless transceiver module receives a packet in order to check the Group ID and recognize a warning device as a group member by the processing module, which further compares the media access control address in the received and scanned packet with the media access control addresses saved in the MAC Address fields of the scan access & control section (the same media access control addresses is mapped: the count of the counter field is reset to "0"; no media access control addresses is mapped: (a) the count of the counter field is increased by "1" until a default value by which a warning device is considered as being out-of-touch by the processing module; (b) the media access control addresses of the warning device considered as being out-of-touch is saved in the MAC Address field of the alarm access & control section and the warning module is notified for signaling a warning message).

In the grouped multi-device anti-loss warning system, the packet further comprises information of a battery level.

A method for executing a grouped multi-device anti-loss warning system comprises steps as follows:

Step for setup of group members: a first warning device creating a packet with information of the Group ID and its unique media access control address is paired with a second warning device also creating a packet with information of the Group ID and its unique media access control address and the unique MAC Address of the first warning device (the second warning device) is recorded and saved in the second warning device (the first warning device) for completing setup of group members;

Step for sending, broadcast, search and scan: the first warning device (the second warning device) sending and broadcasting its own packet receives, scans and saves another packet sent and broadcasted by the second warning device (the first warning device) simultaneously;

Step for recognizing a group member: the first warning device (the second warning device), which compared the Group ID in a received and scanned packet from the counterpart with the self-owned Group ID and verified the Group ID correct, recognizes the second warning device (the first warning device) as a member of the same group and then checks if the group member is out-of-touch later or the first warning device (the second warning device), which verified the Group ID incorrect, recognizes the second warning device (the first warning device) as a non-member, rejects the received packet, and goes back to the step for sending, broadcast, search and scan;

Step for checking a group member out-of-touch: the mutual communication between the first warning device and the second warning device without out-of-touch status is considered as being available and the step for sending, broadcast, search and scan is kept ongoing when the media access control address of the second warning device (the first warning device) in a received and scanned packet is compared with and recognized as the media access control address of a group member saved in the first warning device (the second warning device); otherwise, the second warning device (the first warning device) is considered as being out-of-touch due to no mutual communication between two warning devices and the step for activating a warning message is enabled when a media access control address which is identical to the media access control address of a group member saved in the first warning device (the second warning device) is neither received nor scanned by the first warning device (the second warning device) during preset continuous time (or preset continuous scan times);

Step for activating a warning message: a separate warning message along with a warning signal is produced by the first warning device (the second warning device) and the step for sending, broadcast, search and scan is kept ongoing when a mutual communication is not available to the two warning devices.

The method for executing a grouped multi-device anti-loss warning system further comprises one more step for pairing group members before the step for setup of group members. In the step for pairing group members, a pairing packet in which a Group ID is attached from the first warning device at first time is received and scanned by the second warning device at second time after the first time and the Group ID in the pairing packet is set as the Group ID of the second warning device before setup of a group member.

In the method for executing a grouped multi-device anti-loss warning system, the packet further comprises information of a battery level.

In the method for executing a grouped multi-device anti-loss warning system, a warning message can be light warning or sound warning.

A grouped multi-device anti-loss warning system in the present disclosure has advantages as follows:

After each of warning devices paired with one another and possessing an identical Group ID is qualified as a group member and granted a unique media access control address, the warning device, which sends and broadcasts the Group ID and its own media access control address and simultaneously receives the Group ID and other media access control addresses from other warning devices, is able to recognize another warning device as a group member and decide the recognized group member contactable or non-contactable continuously according to the received Group ID and media access control address and further determine a recognized group member as being contactable and not lost by the recorded media access control address of the group member received and scanned in a period of time (or less than preset scan times) or as being out-of-touch for delivering a warning message to any non-contactable warning device in the case of no recorded media access control address of the group member received and scanned in a period of time (or less than preset scan times). As such, a mutual reminder function for an anti-loss warning effect is available to all warning devices of a grouped multi-device anti-loss warning system in which no master and slave warning device is distinguished in the same group.

BRIEF DESCRIPTION OF THE DRAWINGS

The technical content, purposes and effects of a grouped multi-device anti-loss warning system in the present disclosure are further explained in the preferred embodiment and accompanying drawings which are shown as follows.

DETAILED DESCRIPTION OF THE PREFERRED EMBODIMENT

The technical content, purposes and effects with respect to a grouped multi-device anti-loss warning system in the present disclosure are completely and clearly explained in the preferred embodiment as well as accompanying drawings and numbers thereon.

Figure 1:
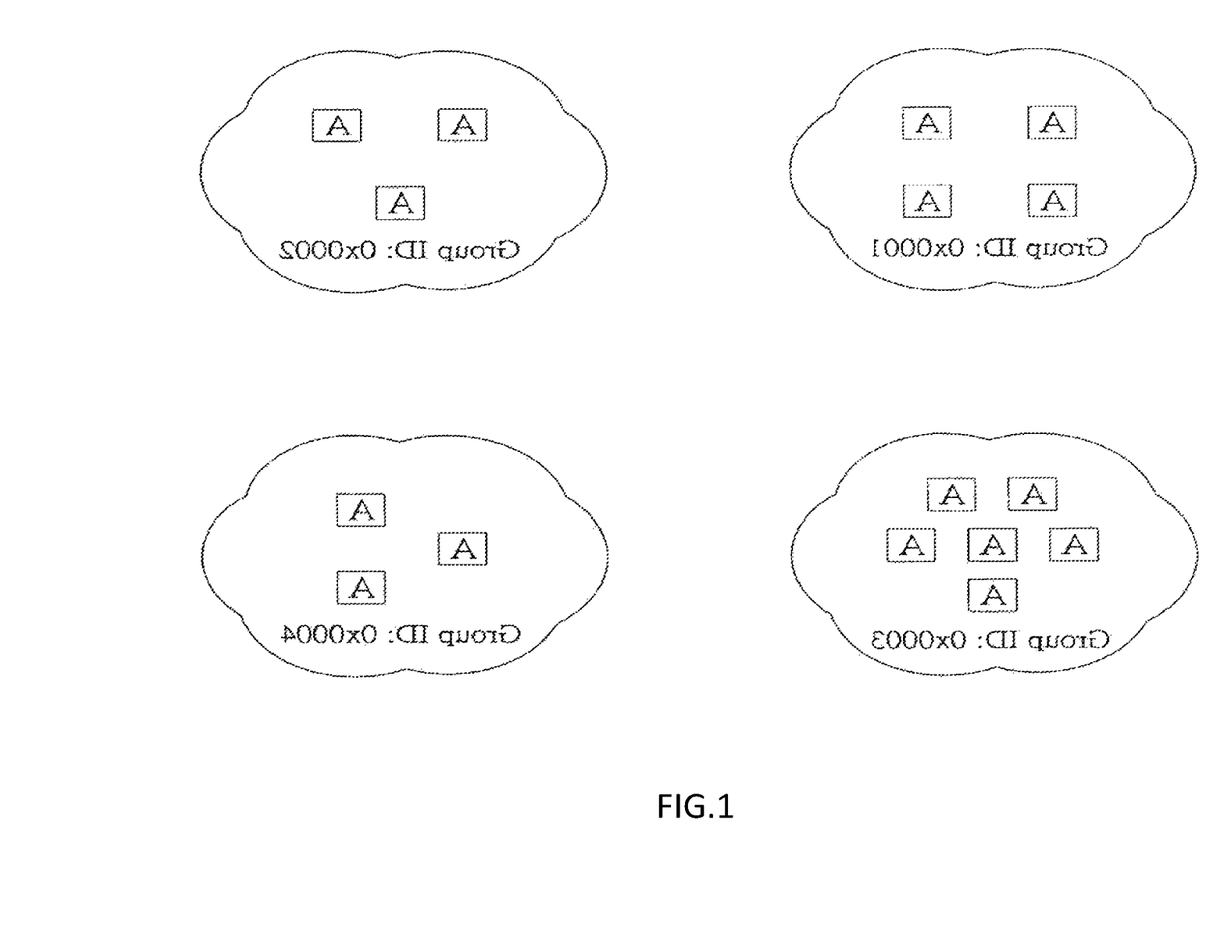
FIG. 1 is a schematic block diagram for architecture of a grouped multi-device anti-loss warning system.

Referring to FIG. 1, which is a schematic view for a plurality of grouped multi-device anti-loss warning systems, each of which is operated for an anti-loss function independently.

Figure 2:
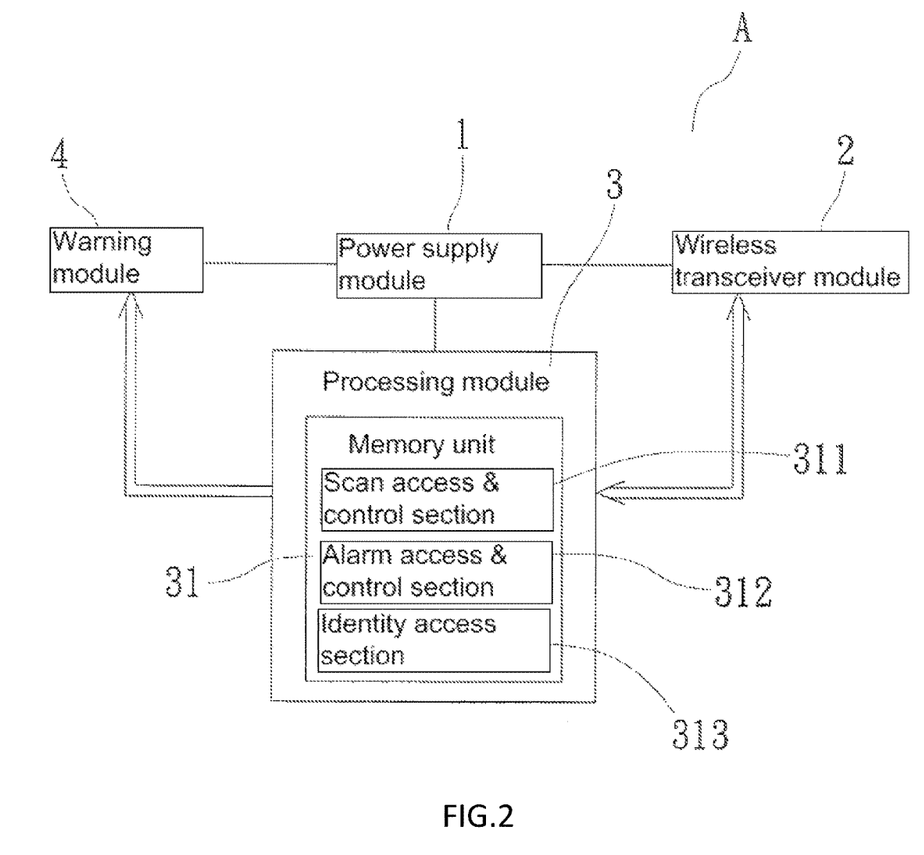
FIG. 2 is an architecture diagram of a warning device in a grouped multi-device anti-loss warning system.
Figure 3:
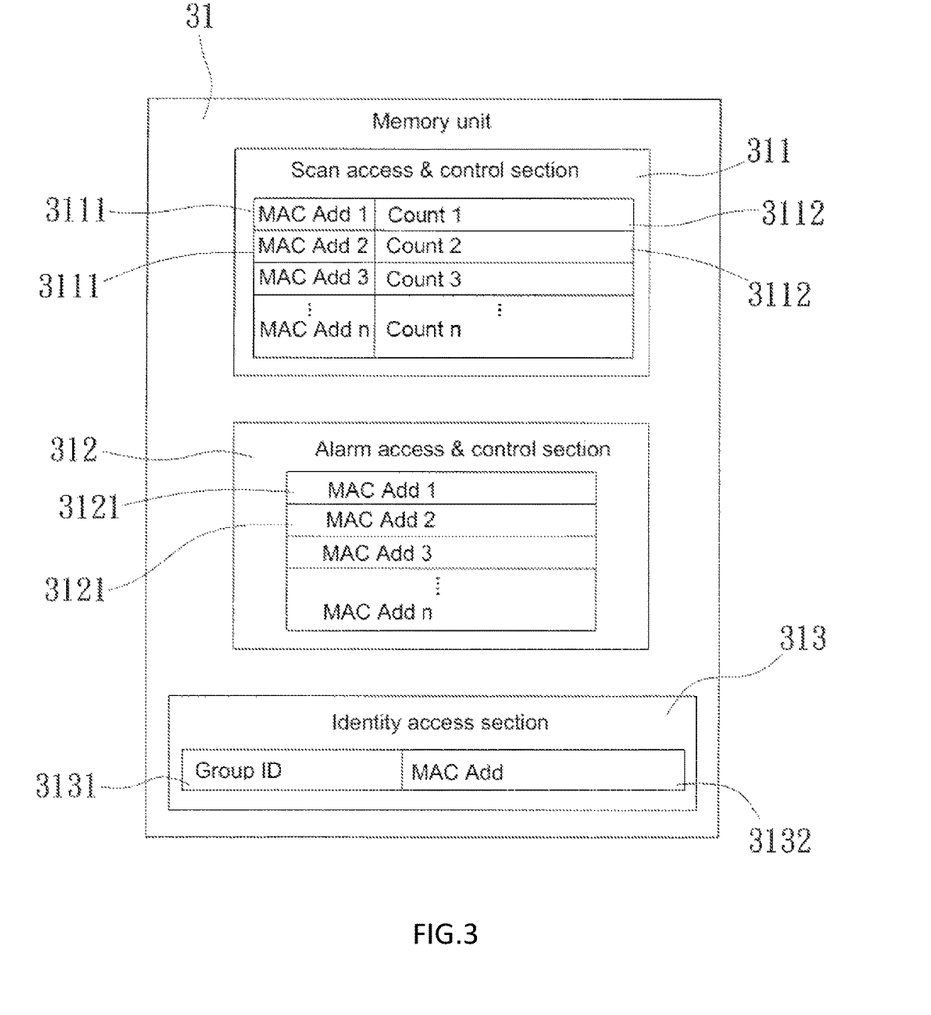
FIG. 3 is a schematic view for accessed data structure in a memory unit within a grouped multi-device anti-loss warning system.

Referring to FIG. 2, which is an architecture diagram of a warning device (A) in a grouped multi-device anti-loss warning system;

A grouped multi-device anti-loss warning system in the present disclosure has a plurality of warning devices (A), each of which comprises a power supply module (1), a wireless transceiver module (2), a processing module (3) and a warning module (4); the wireless transceiver module (2), the processing module (3) and the warning module (4) are electrically connected to the power supply module (1) from which electric power is supplied to the wireless transceiver module (2), the processing module (3) and the warning module (4) wherein:

the wireless transceiver module (2) sends and broadcasts a unique packet during broadcasting time as well as receives and scans packets from other warning devices (A) during receiving & scanning time for storages of the received and scanned packets in a memory unit (31) of the processing module (3) of the warning device (A);

the processing module (3) comprises a memory unit (31) which has a scan access & control section (311), an alarm access & control section (312), and an identity access section (313) wherein the scan access & control section (311) is prepared for accessed data structure in a Media Access Control Address (MAC Address) field (3111) and a corresponding counter field (3112), the alarm access & control section (312) is prepared for accessed data structure in a Media Access Control Address (MAC Address) field (3112), the identity access section (313) is prepared for accessed data in an intrinsic Group ID field (3131) from which a self-owned Group ID is accessed as well as an intrinsic media access control address field (3132) from which a self-owned media access control address is accessed, and the processing module (3) creates a packet in which intrinsic data such as Group ID and MAC Address are attached (FIG. 3);

the warning module (4) is characteristic of a warning message which can be light warning or sound warning or a combination thereof.

As such, a plurality of warning devices (A) paired with one another according to an identical Group ID are categorized as a same group in which each warning device (A) records media access control addresses of other members in the MAC Address fields (3111) of the scan & access control section (311). To explain a grouped multi-device anti-loss warning system conveniently, the patent applicant designates warning devices (A) as the first warning device, the second warning device, and so on. As such, the Group ID in a packet broadcasted from the second warning device (A) and received by the wireless transceiver module (2) of the first warning device (A) is compared with the Group IDs saved in the intrinsic Group ID fields (3131) of the identity access section (313) of the first warning device (A) through the processing module (3) to recognize the first and second warning devices (A) as members of a same group according to the Group ID. If the first and second warning devices (A) are not recognized as members of a same group due to a Group ID incorrect, the data from the second warning device (A) is rejected by the first warning device (A) and a step for sending, broadcast, search and scan is kept ongoing. If the first and second warning devices (A) are recognized as members of a same group due to a Group ID correct, the media access control address in a packet broadcasted from the second warning device (A) and received and scanned by the first warning device (A) is compared with other media access control addresses saved in the MAC Address fields (3111) of the first warning device (A). If the identical media access control address in the first warning device (A) is mapped, the second warning device (A) is considered as staying inside a coverage tracked by the first warning device (A) and the counter field (3112) corresponding to the MAC Address is reset to "0"; if no correct media access control address is mapped, the second warning device (A) (the first warning device (A)) is considered as staying outside a coverage tracked by the first warning device (A) (the second warning device (A)) and the count of the counter field (3112) is increased by "1". When the count of the counter field (3112) is increased up to a default value, the second warning device (A) is considered as being out-of-touch by the processing module (3), which further saves the media access control address of the second warning device (A) in the MAC Address field (3111) of the alarm access & control section (312) of the first warning device (A) and notifies the warning module (4) at the first warning device (A) for signaling a warning message.

Figure 4:
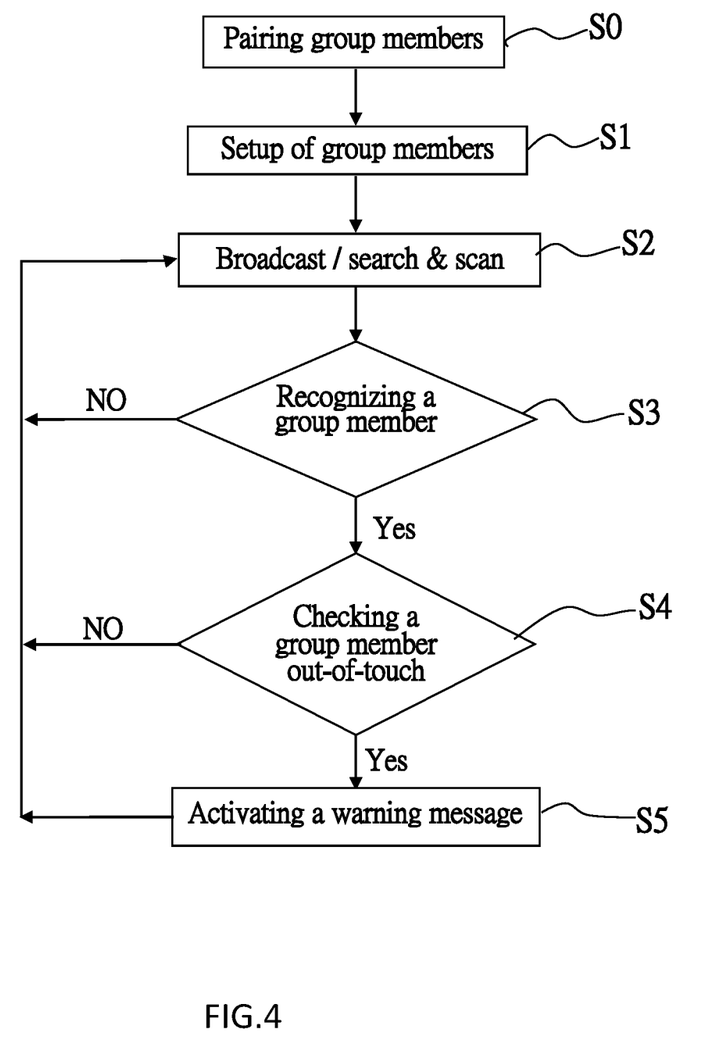
FIG. 4 is a flow diagram for a method for executing a grouped multi-device anti-loss warning system.

Referring to FIG. 4, which further illustrates a method for executing a grouped multi-device anti-loss warning system comprises steps as follows:

Step for setup of group members (S1): the first warning device (A) creating a packet with information of the Group ID and its unique MAC Address is paired with the second warning device (A) also creating a packet with information of the Group ID and its unique media access control address, and the unique media access control address of the first warning device (A) (the second warning device (A)) is recorded and saved in the second warning device (A) (the first warning device (A)) for completing setup of group members;

Step for sending, broadcast, search and scan (S2): the first warning device (A) (the second warning device (A)) sending and broadcasting its own packet receives, scans and saves a packet sent and broadcasted by the second warning device (A) (the first warning device (A)) simultaneously;

Step for recognizing a group member (S3): the first warning device (A) (the second warning device (A)), which compared the Group ID in a received and scanned packet with the self-owned Group ID and verified the Group ID correct, recognizes the second warning device (A) (the first warning device (A)) as a member of the same group and checks if the group member is out-of-touch (as shown in S4) later or the first warning device (A) (the second warning device (A)), which verified the Group ID incorrect, recognizes the second warning device (A) (the first warning device (A)) as a non-member and goes back to the step for sending, broadcast, search and scan (S2);

Step for checking a group member out-of-touch (S4): the mutual communication between the first warning device (A) and the second warning device (A) without out-of-touch status is considered as being available and the step for sending, broadcast, search and scan (S2) is kept ongoing when the media access control address of the second warning device (A) (the first warning device (A)) in a received and scanned packet is compared with and recognized as the media access control address of a group member saved in the first warning device (A) (the second warning device (A)); otherwise, the second warning device (A) (the first warning device (A)) is considered as being out-of-touch due to no mutual communication between two warning devices (A) and the step for activating a warning message (S5) is enabled when the media access control address of the second warning device (A) (the first warning device (A)) in a received and scanned packet is not recognized as the media access control address of a group member saved in the first warning device (A) (the second warning device (A)) and the media access control address identical to the media access control address in the first warning device (A) (the second warning device (A)) is still not received/scanned during preset continuous time (or preset continuous scan times);

Step for activating a warning message (S5): a separate warning message along with a warning signal such as light warning, sound warning, or a combination thereof is produced by the first warning device (A) (the second warning device (A)) and the step for sending, broadcast, search and scan (S2) is kept ongoing when the two warning devices (A) cannot contact each other after preset continuous time (or preset continuous scan times).

Moreover, there is one more step for pairing group members (S0) before the step for setup of group members (S1). In the step for pairing group members (S0), a pairing packet in which a Group ID is attached from the first warning device (A) is received, scanned and saved by the second warning device (A) and the Group ID in the pairing packet is set as the Group ID of the second warning device (A), which will be incorporated into the group of the first warning device (A) and recognized as one member.

In a method for executing a grouped multi-device anti-loss warning system, both the step for setup of group members (S1) and the step for pairing group members (S0) are activated simultaneously or the step for setup of group members (S1) is enabled directly with a warning device (A) granted a factory default Group ID in advance.

Furthermore, the step for pairing group members (S0) is enabled based on a one-to-one rule, that is, the second warning device (A) is granted the Group ID of the first warning device (A) and becomes a group member of the first warning device (A); alternatively, the step for pairing group members (S0) is enabled based on a one-to-many rule, that is, multiple warning devices (A) are granted the Group ID of the first warning device (A) at the same time for less time wasted than the one-to-one rule.

<Embodiment>

Figure 5:
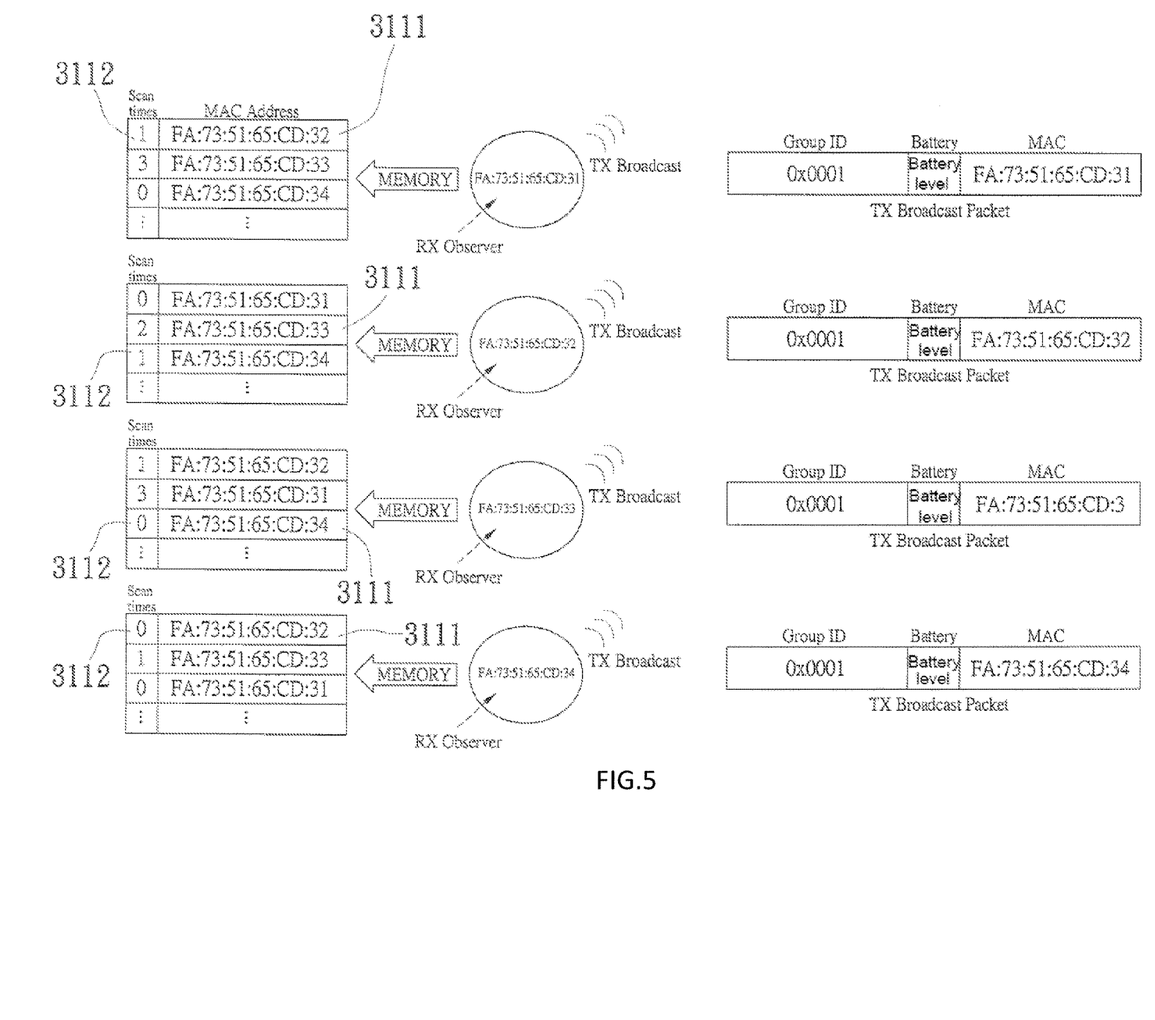
FIG. 5 is a schematic view which illustrates a packet is broadcasted or received by a warning device.

Referring to FIGS. 4 and 5.

The Group ID of the first warning device (A) is set as "0X0001"; each of four warning devices (A), that, is, four candidate members in the embodiment, has its unique "MAC Address" as follows:

| Warning Device | MAC Address |
| --- | --- |
| First warning device | FA:73:51:65:CD:31 |
| Second warning device | FA:73:51:65:CD:32 |
| Third warning device | FA:73:51:65:CD:33 |
| Fourth warning device | FA:73:51:65:CD:34 |

The first warning device (A), the second warning device (A), the third warning device (A) and the fourth warning device (A) produce a separate packet in which an initial Group ID and a MAC Address are attached, respectively. These Group IDs and MAC Addresses in packets sent by these warning devices (A) which are neither paired with one another nor recognized as group members are shown as follows:

|  | Group ID | MAC Add |
| --- | --- | --- |
| First warning device | 0X0001 | FA:73:51:65:CD:31 |
| Second warning device | 2X0001 | FA:73:51:65:CD:32 |
| Third warning device | 3X0001 | FA:73:51:65:CD:33 |
| Fourth warning device | 4X0001 | FA:73:51:65:CD:34 |

Figure 4A:
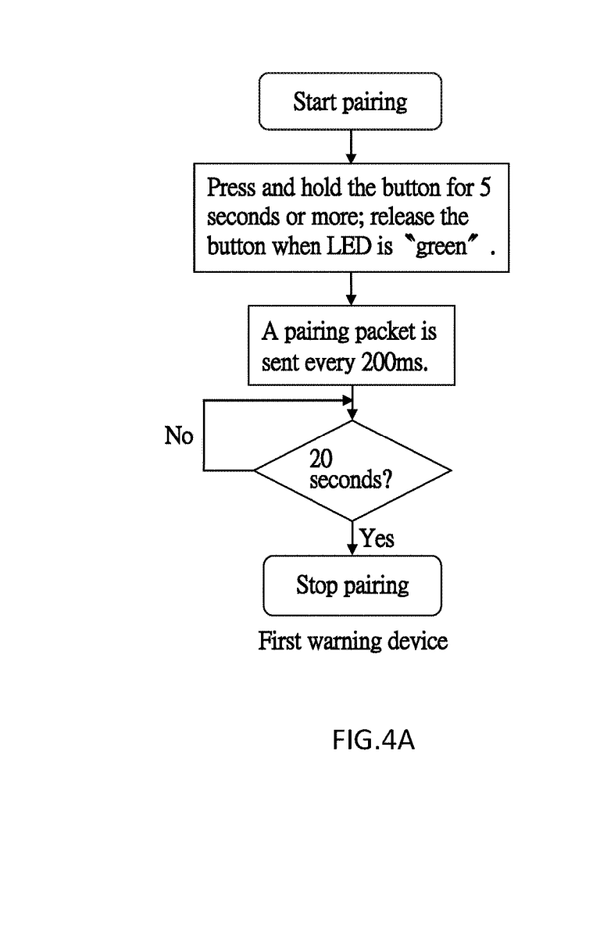
FIG. 4A is a flow diagram which illustrates a pairing packet is sent and broadcasted by the first warning device.
Figure 4B:
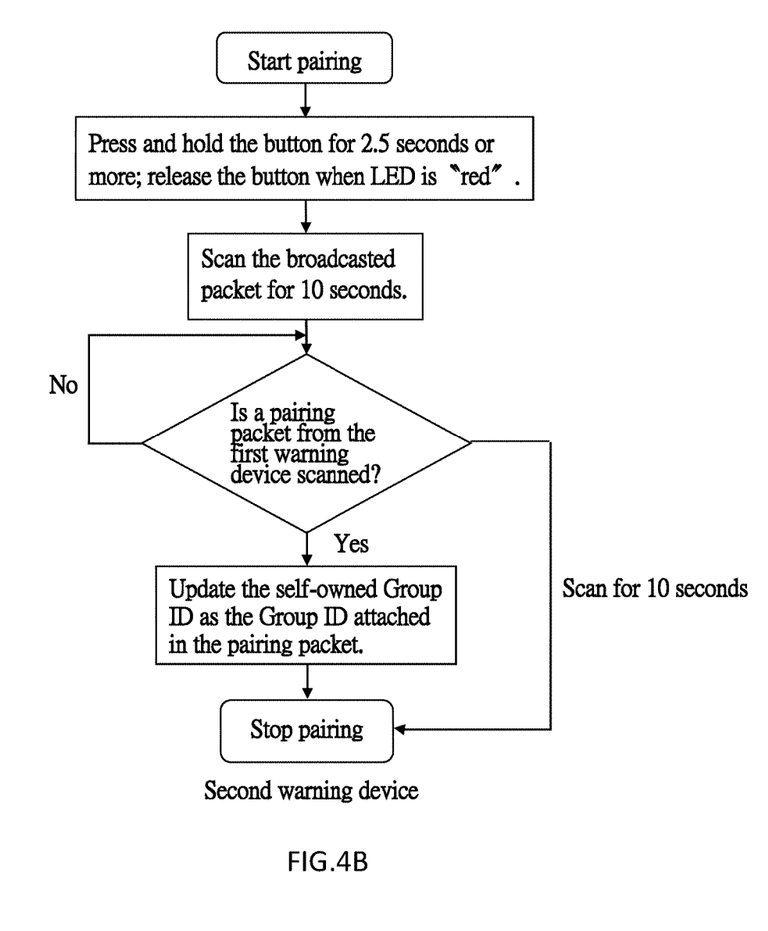
FIG. 4B is a flow diagram which illustrates a pairing packet is received and scanned by the second warning device.

For additions of the second, third and fourth warning devices (A) into the group of the first warning device (A) in the step for pairing group members, a pairing packet in which the Group ID of the first warning device (A) is attached is sent and broadcasted by the wireless transceiver module (2) of the first warning device (A) (FIG. 4A) and received and scanned by the wireless transceiver modules (2) in the second, third and fourth warning devices (A) after the first, second, third and fourth warning devices (A) are energized. With the pairing packet received by the second, third and fourth warning devices (A), the Group ID inside the pairing packet is saved in the second, third and fourth warning devices (A) (FIG. 4B) and a paired group member's media access control address is also saved in other group members' MAC Address fields (3111) of the scan access & control sections (311) of the memory units (31). The Group ID and the MAC Addresses of the first, second, third and fourth warning devices (A) which are paired with one another are shown as follows:

|  | Group ID | MAC Address |
| --- | --- | --- |
| First warning device | 0X0001 | FA:73:51:65:CD:31 |
| Second warning device | 0X0001 | FA:73:51:65:CD:32 |
| Third warning device | 0X0001 | FA:73:51:65:CD:33 |
| Fourth warning device | 0X0001 | FA:73:51:65:CD:34 |

Figure 4C:
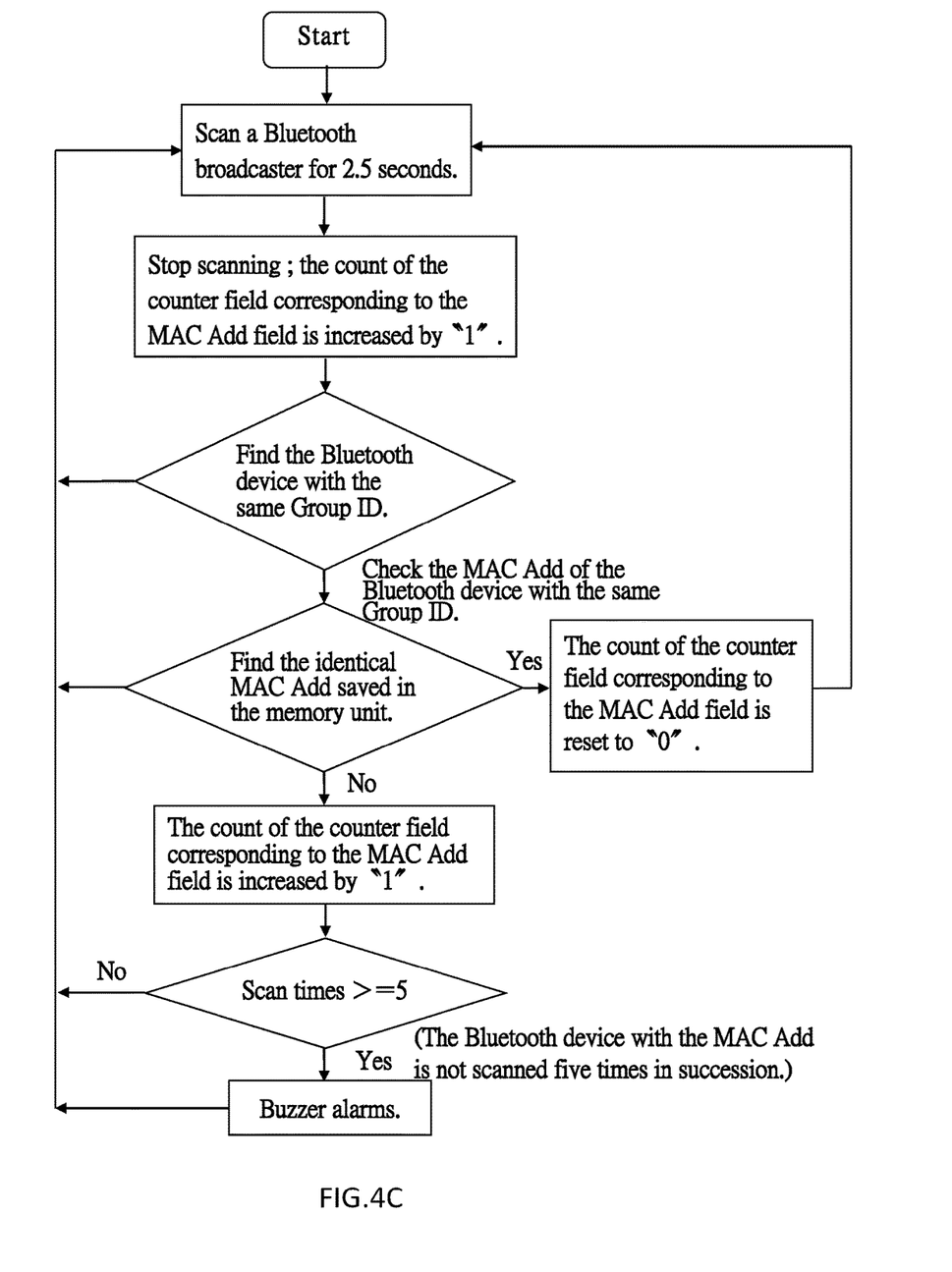
FIG. 4C is a flow diagram which illustrates how a group member is recognized, a group member is considered as being out-of-touch, and a warning mechanism is activated.
Figure 6:
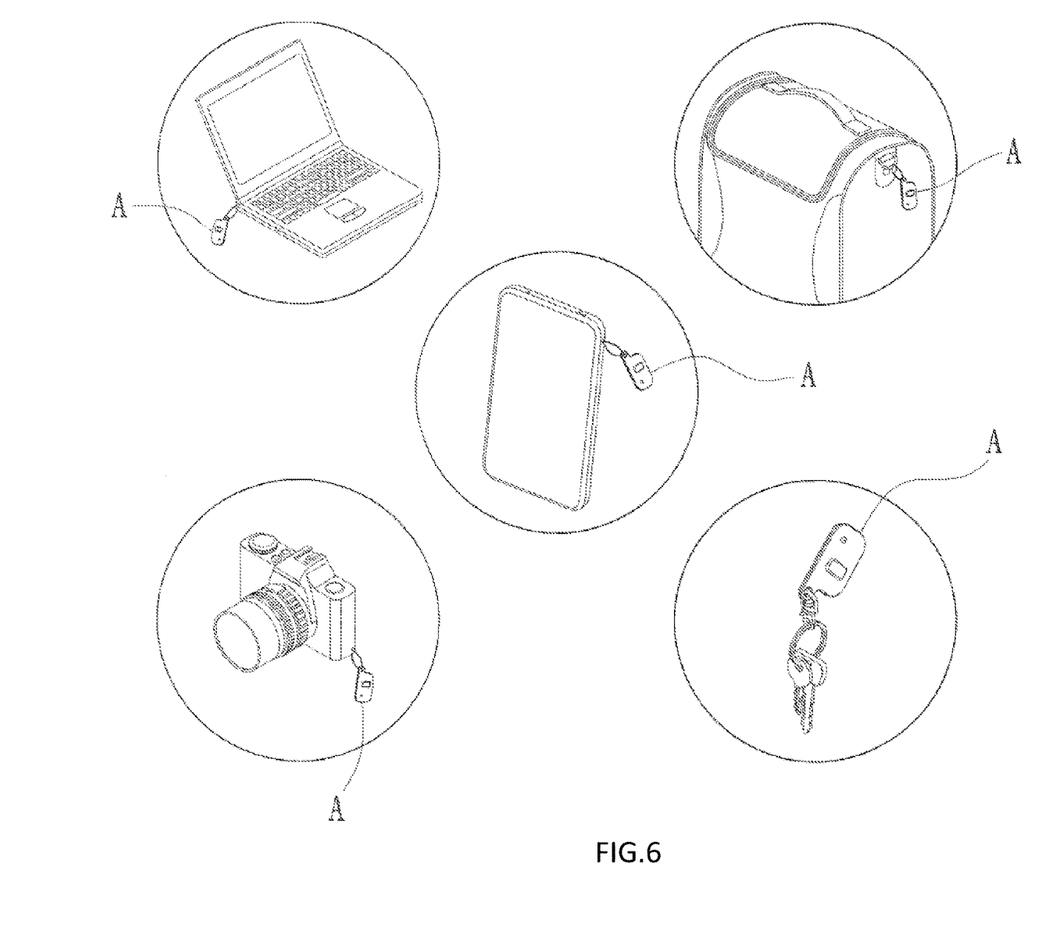
FIG. 6 is a schematic view which illustrates a warning device is combined with a personal belonging.
Figure 7:
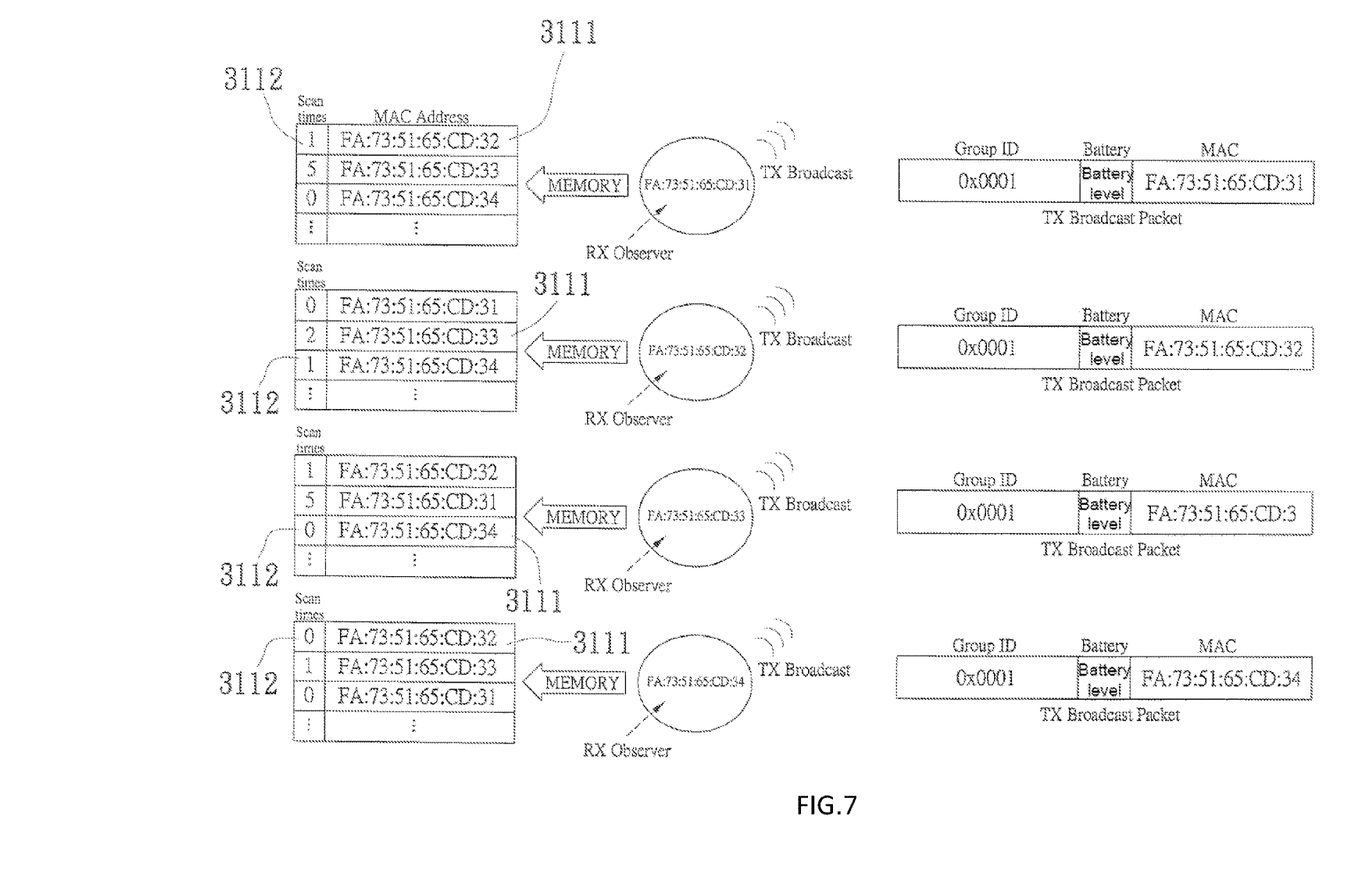
FIG. 7 is a schematic view which illustrates the communication between the first warning device and the third warning device is disrupted five times.

As such, when the first, second, third and fourth warning devices (A) which are paired with one another and designated as the same group are available to four users through personal belongings such as mobile phone, key, wallet, laptop computer and camera (FIG. 6), the wireless transceiver modules (2) of these warning devices (A) will send and broadcast their own packets continuously (FIGS. 4 and 4C) and receive and scan other packets from other sources constantly. A packet broadcasted from another source and received and scanned by the first (second, third or fourth) warning device (A) is transferred to the processing module (3) in which the Group ID in the received packet is compared with the Group ID saved in the first (second, third or fourth) warning device (A) to check and recognize the identity of a candidate member; then, the MAC Address in the received packet is further compared with MAC Addresses of group members saved in the MAC Address fields (3111) of the memory unit (31): if the identical MAC Address is mapped, the count of the counter field (3112) in the scan access & control section (311) is reset to "0"; if no MAC Address of a group member in the MAC Address field (3111) of the memory unit (31) is mapped to the MAC Address in the received packet, the count of the counter field (3112) corresponding to the MAC Address field (3111) for a group member not scanned is increased by "1" (FIG. 5). When the count of the counter field (3112) is "5" that means a group member whose MAC Address was not scanned is not contacted five times in succession, the group member is considered as being out-of-touch as shown in FIG. 7, which illustrates the third warning device (A) (the first warning device (A)) cannot be contacted by the first warning device (A) (the third warning device (A)) five times continuously in the past and the status of the third warning device (A) (the first warning device (A)) is classified as out-of-touch by the first warning device (A) (the third warning device (A)). Then, the MAC Address of the third warning device (A) is transferred to the alarm access & control section (312) of the first warning device (A) by the processing module (3) of the first warning device (A) and the warning module (4) of the first warning device (A) is activated for signaling a warning message; similarly, the MAC Address of the first warning device (A) is transferred to the alarm access & control section (312) of the third warning device (A) by the processing module (3) of the third warning device (A) and the warning module (4) of the third warning device (A) is activated for signaling a warning message. As mentioned previously, two warning devices (A), each of which fails to contact its counterpart and considers the counterpart as out-of-touch, display a warning state and signal a separate warning message to embody a non-master/slave warning system.

The packet sent by a warning device (A) in the present disclosure further comprises information of a battery level.

The above description discloses one embodiment of the present disclosure; however, the embodiment is not intended to limit the scope of the patent application. Any equivalent modification or change without departing from the spirit or features of the present disclosure should be incorporated in the claims thereinafter.

In summary, a grouped multi-device anti-loss warning system, which is effective in implementing expected functions and characteristic of technical measures neither presented in similar products nor published before submission of the patent application, meets novelty and non-obviousness for patentability.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A grouped multi-device anti-loss warning system with a plurality of warning devices, each of them comprises a power supply module as well as a wireless transceiver module, a processing module and a warning module, all of which are electrically connected to the power supply module, wherein:

the wireless transceiver module sends a unique packet during broadcasting time, receives and scans other unique packets from other warning devices during receiving & scanning time, and saves the received and scanned unique packets in a memory unit of the processing module;

the processing module comprises a memory unit which has a scan access & control section, an alarm access & control section, and an identity access section wherein: the scan access & control section is prepared for accessed data structure in a Media Access Control Address (MAC Add) field and a corresponding counter field;

the processing module creates a packet in which data such as Group ID and media access control address are attached; each of a plurality of warning devices, which are paired with one another and categorized into a same group based on an identical Group ID, records media access control addresses of all other members in the MAC Address fields; the alarm access & control section is prepared for accessed data structure in a Media Access Control Address (MAC Add) field;

the wireless transceiver module receives a packet in order to check the Group ID and recognize a warning device as a group member by the processing module, which further compares the media access control address in the received and scanned packet with the media access control addresses saved in the MAC Address fields of the scan access & control section, the same media access control address is mapped: the count of the counter field is reset to "0"; no media access control address is mapped: (a) the count of the counter field is increased by "1" until a default value by which a warning device is considered as being out-of-touch by the processing module; (b) the media access control address of the warning device considered as being out-of-touch is saved in the MAC Address field of the alarm access & control section and the warning module is notified for signaling a warning message.

2. The grouped multi-device anti-loss warning system as claimed in claim 1 wherein the packet further comprises information of a battery level.

3. A method for executing a grouped multi-device anti-loss warning system, comprising steps as follows:

Step for setup of group members: a first warning device creating a packet with information of the Group ID and its unique media access control address is paired with a second warning device also creating a packet with information of the Group ID and its unique media access control address, and the unique media access control address of the first warning device is recorded and saved in the second warning device for completing setup of group members;

Step for sending, broadcast, search and scan: the first warning device sending and broadcasting its own packet receives, scans and saves another packet sent and broadcasted by the second warning device simultaneously;

Step for recognizing a group member: the first warning device which compared the Group ID in a received and scanned packet with the self-owned Group ID and verified the Group ID correct, recognizes the second warning device (the first warning device) as a member of the same group and then checks if the group member is out-of-touch later or the first warning device (the second warning device), which verified the Group ID incorrect, recognizes the second warning device (the first warning device) as a non-member, rejects the received packet, and goes back to the step for sending, broadcast, search and scan;

Step for checking a group member out-of-touch: a mutual communication between the first warning device and the second warning device without out-of-touch status is considered as being available and the step for sending, broadcast, search and scan, that is sending and broadcasting self-owned packet as well as searching and scanning other packets is kept ongoing when the media access control address of the second warning device in a received and scanned packet is compared with and recognized as the media access control address of a group member saved in the first warning device;

otherwise, the second warning device is considered as being out-of-touch due to no mutual communication between two warning devices and the step for activating a warning message is enabled when a media access control address which is identical to the media access control address of a group member saved in the first warning device is neither received nor scanned by the first warning device during preset continuous time or preset continuous scan times;

Step for activating a warning message: a separate warning message along with a warning signal is produced by the first warning device and the step for sending, broadcast, search and scan is kept ongoing when a mutual communication is not available to the two warning devices.

4. The method for executing a grouped multi-device anti-loss warning system, further comprising one more step for pairing group members before the step for setup of group members: a pairing packet in which a Group ID is attached from the first warning device at first time is received and scanned by the second warning device at second time after the first time and the Group ID in the pairing packet is set as the Group ID of the second warning device before setup of a group member.

5. The method for executing a grouped multi-device anti-loss warning system as claimed as claim 3 wherein the packet further comprises information of a battery level.

6. The method for executing a grouped multi-device anti-loss warning system as claimed as claim 4 wherein the packet further comprises information of a battery level.

7. The method for executing a grouped multi-device anti-loss warning system as claimed as claim 5 wherein a warning message can be light warning or sound warning.

8. The method for executing a grouped multi-device anti-loss warning system as claimed as claim 3 wherein a warning message can be light warning or sound warning.

9. The method for executing a grouped multi-device anti-loss warning system as claimed as claim 4 wherein a warning message can be light warning or sound warning.

* * * * *